(12) United States Patent
Scheidt

(10) Patent No.: US 7,111,173 B1
(45) Date of Patent: Sep. 19, 2006

(54) ENCRYPTION PROCESS INCLUDING A BIOMETRIC UNIT

(75) Inventor: Edward M. Scheidt, McLean, VA (US)

(73) Assignee: Tecsec, Inc., Vienna, VA (US)

( * ) Notice: Subject to any disclaimer, the term of this patent is extended or adjusted under 35 U.S.C. 154(b) by 0 days.

(21) Appl. No.: 09/388,195

(22) Filed: Sep. 1, 1999

Related U.S. Application Data

(60) Provisional application No. 60/098,915, filed on Sep. 1, 1998.

(51) Int. Cl.
*H04L 9/32* (2006.01)
*G06F 12/14* (2006.01)
*H04K 1/00* (2006.01)
*H04L 9/00* (2006.01)

(52) U.S. Cl. .............. 713/186; 713/175; 713/176; 713/194; 380/46

(58) Field of Classification Search .............. 380/21, 380/286
See application file for complete search history.

(56) References Cited

U.S. PATENT DOCUMENTS

| | | | |
|---|---|---|---|
| 4,145,568 A | 3/1979 | Ehrat | |
| 4,200,770 A | 4/1980 | Hellman et al. | |
| 4,218,582 A | 8/1980 | Hellman et al. | |
| 4,864,616 A | 9/1989 | Pond et al. | |
| 5,208,853 A * | 5/1993 | Armbruster et al. | 705/56 |
| 5,276,738 A | 1/1994 | Hirsch | |
| 5,347,580 A * | 9/1994 | Molva et al. | 713/159 |
| 5,499,297 A | 3/1996 | Boebert | |
| 5,541,994 A | 7/1996 | Tomko et al. | |
| 5,557,678 A | 9/1996 | Ganesan | |
| 5,623,546 A * | 4/1997 | Hardy et al. | 713/193 |
| 5,627,894 A | 5/1997 | Albert et al. | |
| 5,689,566 A * | 11/1997 | Nguyen | 713/155 |
| 5,694,472 A | 12/1997 | Johnson et al. | |
| 5,710,815 A | 1/1998 | Ming et al. | |
| 5,751,808 A | 5/1998 | Anshel et al. | |
| 5,761,305 A | 6/1998 | Vanstone et al. | |
| 5,778,069 A | 7/1998 | Thomlinson et al. | |
| 5,815,573 A | 9/1998 | Johnson et al. | |
| 5,857,025 A | 1/1999 | Anderson et al. | |
| 5,991,406 A * | 11/1999 | Lipner et al. | 380/286 |
| 5,991,408 A * | 11/1999 | Pearson et al. | 713/186 |
| 6,009,177 A * | 12/1999 | Sudia | 713/191 |
| 6,185,685 B1 * | 2/2001 | Morgan et al. | 713/183 |
| 6,490,680 B1 * | 12/2002 | Scheidt et al. | 713/166 |
| 6,542,608 B1 * | 4/2003 | Scheidt et al. | 380/44 |
| 6,549,623 B1 * | 4/2003 | Scheidt et al. | 380/44 |

(Continued)

FOREIGN PATENT DOCUMENTS

WO  98/36520  * 8/1998

(Continued)

OTHER PUBLICATIONS

Jablon, "Strong Password-Only Authenticated Key Exchange", Sep. 25, 1996, ACM SIGCOMM Computer Communication Review, p. 5-26.*

*Primary Examiner*—Christopher Revak
(74) *Attorney, Agent, or Firm*—IP Strategies

(57) ABSTRACT

A method of encrypting an object includes generating a cryptographic key, using the cryptographic key to initialize a cryptographic algorithm, and applying the algorithm to the object. Accordingly, an encrypted object is formed. The key is generated by combining key splits derived from different sources. One of the key splits is a biometric value derived from and corresponding to a particular person.

58 Claims, 2 Drawing Sheets

U.S. PATENT DOCUMENTS

| | | | |
|---|---|---|---|
| 6,606,386 B1 * | 8/2003 | Scheidt et al. | 380/44 |
| 6,608,901 B1 * | 8/2003 | Scheidt et al. | 380/44 |
| 6,684,330 B1 * | 1/2004 | Wack et al. | 713/162 |
| 6,816,970 B1 * | 11/2004 | Morgan et al. | 713/183 |
| 6,845,453 B1 * | 1/2005 | Scheidt et al. | 726/5 |
| 6,885,747 B1 * | 4/2005 | Scheidt et al. | 380/264 |
| 2002/0062451 A1 * | 5/2002 | Scheidt et al. | 713/201 |
| 2002/0071554 A1 * | 6/2002 | Scheidt et al. | 380/44 |
| 2002/0076045 A1 * | 6/2002 | Scheidt et al. | 380/44 |
| 2002/0080970 A1 * | 6/2002 | Scheidt et al. | 380/277 |
| 2003/0039358 A1 * | 2/2003 | Scheidt et al. | 380/47 |
| 2003/0172280 A1 * | 9/2003 | Scheidt et al. | 713/182 |
| 2004/0101139 A1 * | 5/2004 | Wack et al. | 380/277 |
| 2004/0208316 A1 * | 10/2004 | Wack et al. | 380/44 |

FOREIGN PATENT DOCUMENTS

| | | | |
|---|---|---|---|
| WO | 00/54455 | * | 9/2000 |

* cited by examiner

ENCRYPTION PROCESS INCLUDING A BIOMETRIC UNIT

CROSS-REFERENCE TO RELATED PATENTS AND APPLICATIONS

This is related to U.S. Provisional Patent Application Ser. No. 60/098,915, filed on Sep. 1, 1998, priority of which is claimed under 35 U.S.C. § 119. This is also related to U.S. Pat. No. 5,375,169, entitled "Cryptographic Key Management Method and Apparatus," which issued on Dec. 20, 1994 to SCHEIDT et al., to U.S. Pat. No. 5,787,173, entitled "Cryptographic Key Management Method and Apparatus," which issued on Jul. 28, 1998 to SCHEIDT et al., and to U.S. Pat. No. 6,229,445, entitled "RF Identification Process and Apparatus," which issued on May 8, 2001 to WACK. This is also related to the following U.S. patent applications: Ser. No. 08/974,843, entitled "Cryptographic Medium," filed on Nov. 20, 1997 by WACK et al., which is now abandoned; Ser. No. 09/023,672, entitled "Cryptographic Key Split Combiner," filed on Feb. 13, 1998 by SCHEIDT et al., which is now U.S. Pat. No. 6,885,747; Ser. No. 09/874,364, entitled "Cryptographic Key Split Combiner," filed on Jun. 6, 2001 by SCHEIDT et al.; Ser. No. 09/917,795, entitled "Cryptographic Key Split Combiner," filed on Jul. 31, 2001 by SCHEIDT et al., which is now U.S. Pat. No. 6,542,608; Ser. No. 09/917,794, entitled "Cryptographic Key Split Combiner," filed on Jul. 31, 2001 by SCHEIDT et al., which is now U.S. Pat. No. 6,608,901; Ser. No. 09/917,802, entitled "Cryptographic Key Split Combiner," filed on Jul. 31, 2001 by SCHEIDT et al., which is now U.S. Pat. No. 6,549,623; Ser. No. 09/917,807, entitled "Cryptographic Key Split Combiner," filed on Jul. 31, 2001 by SCHEIDT et al., which is now U.S. Pat. No. 6,606,386; Ser. No. 09/992,529, entitled "Cryptographic Key Split Binder for Use With Tagged Data Elements," filed on Nov. 20, 2001 by SCHEIDT et al.; Ser. No. 09/421,293, entitled "Secure Accounting and Operational Control and Reporting System," filed on Oct. 20, 1999 by KOLOUCH, which is now U.S. Pat. No. 6,694,433; Ser. No. 09/205,221, entitled "Access Control and Authorization System," filed on Dec. 4, 1998 by Scheidt et al., which is now U.S. Pat. No. 6,490,680; Ser. No. 09/418,806, entitled "Cryptographic Information and Flow Control," filed on Oct. 15, 1999 by WACK et al., which is now U.S. Pat. No. 6,684,330; Ser. No. 09/936,315, entitled "Voice and Data Encryption Method Using a Cryptographic Key Split Combiner," filed on Sep. 10, 2001 by SCHEIDT; Ser. No. 10/035,817, entitled "Electronically Signing a Document," filed on Oct. 25, 2002 by SCHEIDT et al.; Ser. No. 10/060,039, entitled "Multiple Factor Based User Identification and Authentication," filed on Jan. 30, 2002 by SCHEIDT et al., which is now U.S. Pat. No. 6,845,453; and Ser. No. 10/060,011, entitled "Multiple Level Access System," filed on Jan. 30, 2002 by SCHEIDT et al., which is now U.S. Pat. No. 6,754,820.

FIELD OF THE INVENTION

The present invention is directed to methods of safeguarding data and restricting physical or electronic access. In particular, the present invention uses a biometric input to enhance protection.

BACKGROUND OF THE INVENTION

The present invention is a cryptographic key management system that uses pre-positioned key splits to build cryptographic keys when needed. This paper describes an architecture that provides a complete cryptosystem for today's large distributed networks. The management system of the present invention will be referred to herein as "CKM".

Keys are an essential part of all encryption schemes. Their management is a critical element of any cryptographic-based security. The true effectiveness of key management is the ability to have keys created, distributed, and maintained without requiring user interaction and without penalizing system performance or costs.

As symmetric, also called public-key, cryptography has received significant attention in recent years. The public-key method includes separate public encryption and private decryption keys that provide a measure of difficulty in deriving the private key from the public key. Public-key management was developed to establish cryptographic connectivity between two points in a communications channel after which a symmetric cryptogen, such as DES (Data Encryption Standard), was to be executed. Over the years public-key implementations have demonstrated their effectiveness to authenticate between entities. However, public-key methods have not been able to successfully handle the requirements of today's global networks.

Many of the recent public-key implementations allow users to create their own keys. This can leave an organization vulnerable, and in some cases liable, if users leave and fail to identify their private keys. Also, to ensure the integrity of public keys, third party infrastructure designs have been proposed. A Certificate Authority process confirms that a certain public key was issued to a specific user. The exchange of certificates with a third party can significantly impact the performance of a network.

The public-key process is also associated with high computation times. In many instances, hardware solutions have compensated for these high computational requirements. Since public-key architectures have been historically point-to-point designs, moving to a distributed network with group sharing of information can create higher transmission costs and greater network impact. While public-key management systems work well for point-to-point communications and one-to-one information transfer, they are too time consuming for a single file placed on a server and decrypted by thousands of users. As the trend toward work groups and complex communications infrastructures continues, the need for a more efficient information and communications key management technology becomes paramount.

Shared secret keys used with symmetric key cryptosystems is the earliest key management design and pre-dates public-key management. Early symmetric key designs suffered from the "n-squared" problem since the number of keys required becomes very large and unmanageable as the number of users increase. In addition, these designs did not have effective authentication. Symmetric encryption does have significantly better processing performance than public-key implementations.

CKM builds on the advantages, and takes into account the disadvantages, of both public-key and symmetric key implementations. CKM combines an encryption process based on split key capability with access control credentials and an authentication process based on public-key techniques. CKM is most effective in modern distributive information models where information flow and control can be defined, where the information encrypted may need to be recovered, and where authentication using public-key technology and a physical token can be implemented.

This paper emphasizes the encryption of data-at-rest as opposed to data-in-transit. Data-at-rest refers to data encrypted as logical units (objects) and includes the creation, processing, transfer, and storage of these objects. Data-in-transit refers to the stream encryption of data moving through a physical or logical communication channel during a certain period of time. CKM can perform both types of encryption. The data-in-transit capability will be emphasized in a future release of this paper.

SUMMARY OF THE INVENTION

Current CKM technology meets the set of "classical" security objectives.
1. Data confidentiality keeps the content of information from being revealed to those who are not authorized to read it. CKM uses symmetric key cryptography with a robust key management system that provides a new and unique working key for each encryption. The user "selects" the readership or has the readership defined for each encrypted object. An object can be data-at-rest, such as a file, a message, or data-in-transit, such as network traffic.
2. Access control restricts use of encrypted objects to those users specifically given permission to use them. Access control in CKM can be role-based for which permissions are granted and revoked based on that user's responsibility or position within an organization. It currently encompasses the actions of encryption and decryption but may include permissions to use certain programs, certain devices or specific hardware operating modes. Access control may also be extended to data base applications.
3. User Authentication establishes the identity of a user (person or device) to the system. User authentication becomes stronger when other enhancements, discussed below are added to CKM.

Smart cards and biometrics provide CKM greater security in meeting the third objective, User Authentication. As well as providing stronger user authentication when used as a token, a smart card can be an excellent hardware platform to implement various levels of CKM technology. The card may be used as a memory only device, or it can be expanded to include processing capability. An advanced smart card, called the SuperCard™ is an enabling technology for CKM. Along with its increased processing and memory, the SuperCard™ includes a unique radio frequency signature and random number generation capability.

Adding biometrics to CKM enhances user authentication and may provide pieces of information for generating the private key part for the asymmetric key cryptographic system that CKM uses for digital signatures.

Inherent in CKM is the means to meet two additional objectives:
4. Data separation is the ability to keep data in the same physical space yet still enforce access controls. Two cryptographic means of separation are used in CKM—separation by algorithm and separation by label.
5. Key recovery in CKM is the ability to regenerate the keys used to encrypt objects. Key recovery means that within any particular CKM domain (or organization) encrypted objects are not lost with the loss of any individual. Key recovery for export is also possible.

Asymmetric key cryptography used for digital signatures offers CKM the means to meet three additional security objectives concerned with message authentication:
6. Data origin authentication (sometimes called message authentication) corroborates the source of CKM encrypted information.
7. Data integrity is the ability to prove that a CKM encrypted object has not been altered since being encrypted and digitally signed. If digital signatures are not used a Message Authentication Code (MAC) or Manipulation Detection Code (MDC) with encryption can provide data integrity.
8. Non-repudiation proves that the signature on a signed object came from the signatory such that the signatory cannot deny digitally signing the object.

DETAILED DESCRIPTION OF THE INVENTION

The basic CKM design focuses on the functions needed for encryption and decryption of objects and the distribution of keys. High performance symmetric key cryptographic algorithms and a patented method of key management are used at this level. Another level, focusing on authentication, uses smart cards and biometrics to create strong entity authentication and uses digital signatures for message authentication. A third level that adds a mix of detection techniques for internally protecting the CKM authentication and encryption processes is added when the environment requires more security.

Overview of CKM Technology

Figure 1:
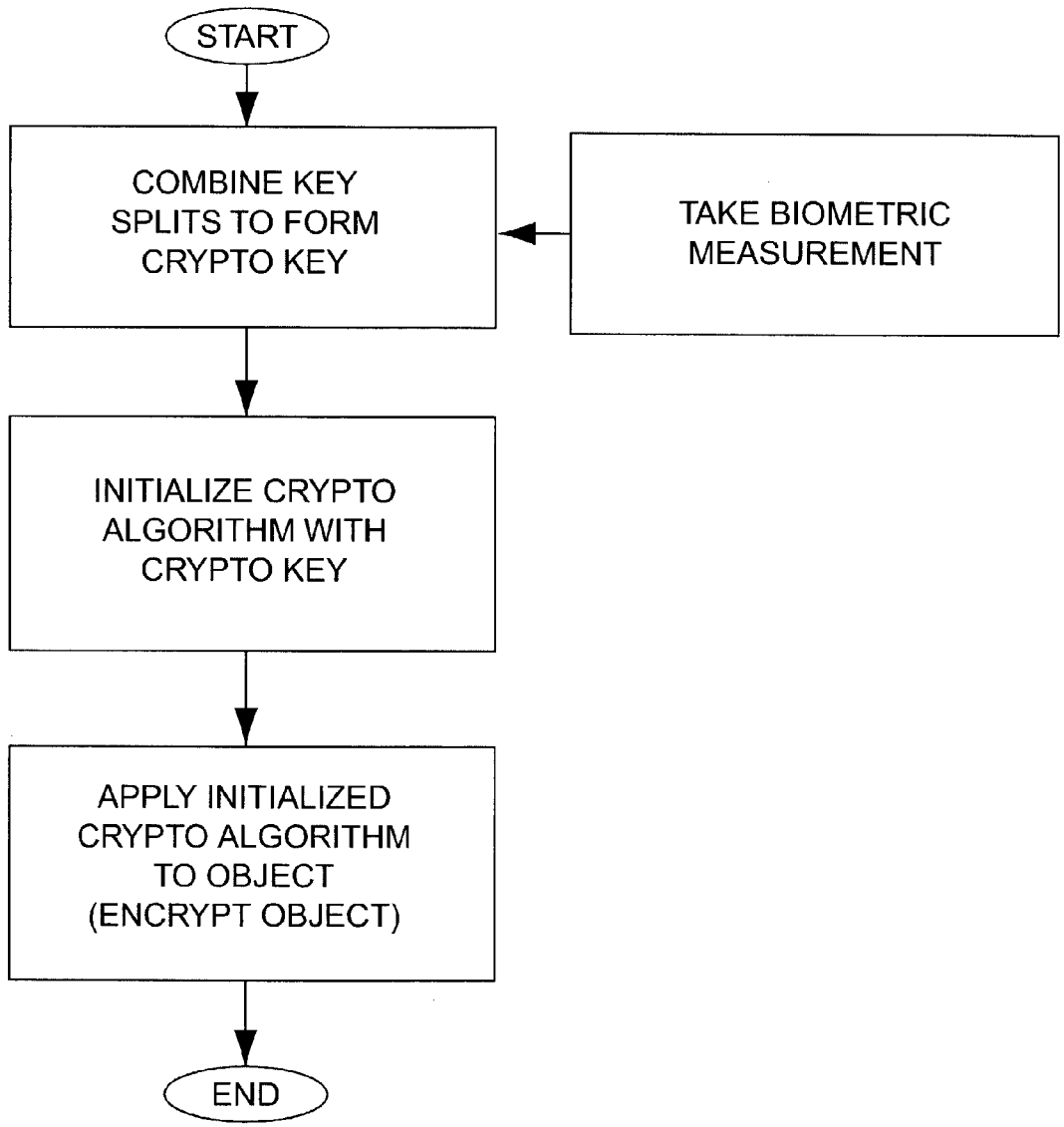
FIG. 1 is a flow diagram of an exemplary encryption process according to the present invention.

As shown, for example, in FIG. 1, CKM is a technology for generating and regenerating cryptographic keys, and managing those keys within an organization. A cryptographic working key is generated immediately before an object is encrypted or decrypted. It is used to initialize a cryptographic algorithm for encryption or decryption. The working key is discarded after use.

The working key is built from many pieces of information. To be a participant in the system, a user must have the pieces necessary to build the key; otherwise encryption and decryption cannot take place. A central authority generates these pieces, which are called cryptographic key splits. A subset of these splits is distributed to each user in the organization. The subset that each user receives is specific to that person and defines what labels that individual may use to encrypt (known as write permission) and which labels that individual may use to decrypt (known as read permission). Several user authentication techniques are used to verify a user to the CKM system before that user is allowed access to this information.

To build a key, a constant system wide-split, called the organization split and a variable system wide split, called the maintenance split are used. To this are added a random number, which is called the random split, and user selected label splits. The random split ensures that a unique working key is created for each use. User selected label splits define the "readership" of the CKM encrypted object, i.e. which users will be able to decrypt the object. All of these splits are input to a process known as the CKM combiner process. The output of the combiner process is a unique number that is used as the basis for the session key.

CKM uses a hierarchical infrastructure to manage the distribution of information necessary for CKM enabled software to construct cryptographic keys. This infrastructure also provides a method of user certificate and public key distribution for asymmetric key cryptography so that digital signatures may be used.

Infrastructure

CKM is structured as a three tier hierarchical system. The top tier is a process identified as the Policy Manager. This process enables the "central authority" for the encryption domain to generate splits, which in current implementations of CKM are 512 random bits, to be used in key generation. Splits are labeled and are used in combination by users to generate cryptographic keys.

The next tier in the hierarchy is a process identified as the Credential Manager. This process is given a subset of labels and specific algorithms and policies from the Policy Manager. Individuals are allocated use of specific labels and algorithms from the Credential manager's subset. Organizational policies and system parameters generated by the Policy Manager are added to these labels forming an individual's credentials. A user's credentials are encrypted and distributed to that user on a "token", such as a diskette or a smart card, or installed on a workstation or server. The process of label and algorithm allocation by the Credential manager allows an organization to implement a "role-based" system of access to information.

As a convenience to the Credential managers, password Supervisors may securely distribute "first use" passwords to users that will unlock user credentials the first time they are used.

Access to user credentials is controlled at the user tier of the CKM hierarchy with a password initially assigned by the Credential Manager. The password is changed at the time of first use by the user and is known only to the user. This provides rudimentary user authentication. Stronger authentication is provided by enhancements to CKM.

User authentication enhancements include a smart card—a processor and memory packaged into a plastic card, like a credit card—that can hold pieces of information for user authentication. It can also retain information for use by CKM and provide processing for CKM. A smart card with tamper resistance and hardware random number generation capability offers additional security.

Another authentication enhancement is the use of biometric data. Biometric data is physiological or behavioral information that is unique to each individual and that does not change during that individual's lifetime. Furthermore, it has to be something that can be digitized and used by a computer. In addition to strong user authentication, biometric data may be used in the creation of private keys for digital signatures.

For data integrity alone, a Message Authentication Code (MAC) can be used. Instead of the CKM generated key being used to initialize symmetric key algorithms, a generated key is used to initialize a MAC. Manipulation Detection Codes (MDCs) can also be used to provide data integrity and secrecy when combined with CKM encryption.

If data origin authentication, data integrity and non-repudiation are required, then the CKM infrastructure is used to provide the means to distribute public keys which give CKM the ability to use cryptographic bound digital signatures. If a digital signature is used, MACs or MDCs are not required. Combining digital signatures with the basic CKM design and adding user authentication enhancements establishes the means to meet the security objectives stated above.

Combiner Function and Splits

Figure 2:
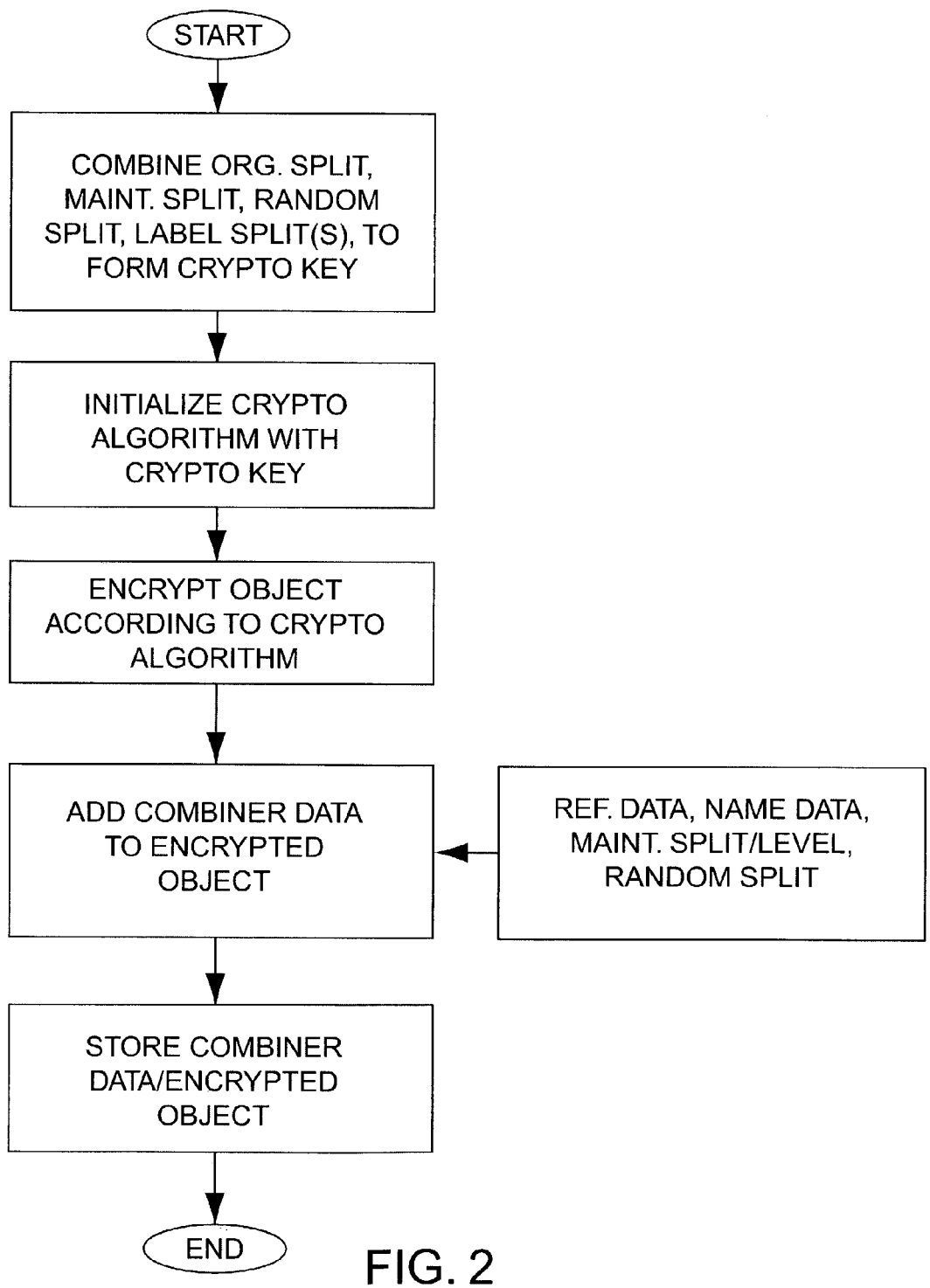
FIG. 2 is a flow diagram of an exemplary encryption and storage process according to the present invention.

As shown, for example, in FIG. 2, the CKM combiner is a non-linear function that takes multiple input and produces a single integer. The integer output is used as the session key for encrypting and decrypting objects.

The starting point for the combiner function is the organization split. Everyone in the organization has access to the split. It is equivalent to what is usually called the system key.

During encryption, a user will choose one or more label splits to be used in the combiner process. This will define the readership of the encrypted object, as only those who have read access to splits used for encryption will be able to decrypt the object. The selection and usage of an organization's labels by users should be taken into account in designing the label set. Good label set design should mirror an organization's established information compartments. Access to labels that can be provided to a user by a Credential Manager based on the role of that user within the organization.

It is also possible, at either the Credential manager or Policy manager level, to specify mandatory use labels for a specific user or group of users. These correspond to label splits that are always used when the user encrypts an object. The user has no choice in their selection—they are used automatically in the combiner.

A random split, generated for each encryption, is another split that is provided as input to the combiner function to make the final working key. Because a new random split is generated at each encryption, the working key is always changing. It will not be the same even if the same object is encrypted again using the same labels. The random number should ideally come from a hardware based random number generator. However, if hardware is not available, a software based pseudo-random number generator must be used.

The maintenance split is used for key updating and compromise scenarios. The organization's policy may require that one of the splits be periodically changed. The maintenance split is changed in order to make an organization wide impact. The Policy Manager can periodically generate a new maintenance split that is distributed to users via credentials file updates. Generation of the maintenance split is done in such a manner that all the previous maintenance splits may be recovered. Thus, for data-at-rest architectures, previously encrypted data can be recovered. For data-in-transit architectures, such as encrypted network traffic, there is no need to recover previous maintenance splits.

The maintenance split may be used to exclude someone from the organization domain. If an individual does not have credentials which have been updated with the new maintenance split, then that individual will not be able to decrypt objects that have been encrypted using this new maintenance split. Updating the maintenance split will also protect data encrypted if a user's credentials have been compromised.

In summary, the organization split is a constant number used in all encryption. The maintenance split is used to maintain a periodic change to the working key's input. The user selects label splits, and the random split is always unique, thus ensuring that every encrypted object has a different key.

Cryptographic Algorithms

As shown, for example, in FIG. 1, CKM, with its pre-positioned splits in user credentials, provides key management for symmetric key cryptographic algorithms. The impact of the classical n-squared key management problem has been lessened without resort to asymmetric or "public-key" cryptographic systems. However, the infrastructure provided for the private key management solution can also be used for public-key management. Asymmetric key cryptosystems are used in CKM for message authentication and may be used for user credential distribution and for key exchange for the communications protocol between workstation and smartcard.

Preferably, a minimum of two symmetrical key algorithms are provided for use with CKM—for example, $P^2$, (a stream cipher algorithm) and the U.S. Data Encryption Standard (DES) algorithm, a block cipher algorithm. Other algorithms are available subject to business considerations, such as United States export regulations and license agreements.

For the DES block algorithm, four different operating modes are provided—Electronic Code Book (ECB), Cipher Block Chaining (CBC), Output Feedback (OFB) and Cipher Feedback (CFB). In addition, CFB is offered in 1-bit, 8-bit, or n-bit feedback where n is the block size (or integral division of block size). Output feedback is also available in counter mode.

Triple encryption is also available for every block algorithm subject to export regulations. This means that not only triple DES is available but also, for example, triple IDEA, triple RC5, etc. could be used. As with all block algorithms the four stated operating modes are available. There are additional operating modes available with triple encryption and decryption.

The Policy manager may rename an algorithm and operating mode. Different algorithms may be put to use for different purposes and an algorithm's name may reflect its use. The names of the algorithms that a user has permission to use are contained in the user's credentials. Since the Policy and Credential Managers control access to algorithms, applying different algorithms has the effect of further compartmenting access to encrypted data.

Symmetric key algorithms are used in CKM for encrypting objects. They are also used internally in CKM processes, such as in the combiner. Asymmetric key cryptographic systems may also be used in CKM for message authentication, credential distribution and the key exchange protocol between smart card and workstation.

A biometric reading may provide the basis for a user's private key used for message authentication. In this case the private key need not be stored since the user can recover it by taking the biometric reading. The public key used for authentication is usually derived from this private key and is stored in the user's Credential Manager's database. To base the private key on a biometric reading requires special properties regarding the biometric. Normally, these special properties do not apply, in which case the private key will need to be generated by the user and stored, usually on a user's workstation or smartcard. A secure backup is needed for this private key in case of loss. Note that the Credential manager will not have access to a user's private key used for authentication.

The public-key pair for each user that is used for credential distribution is generated and stored by the Credential Manager. Since these key pairs are used only to encrypt information from the Credential manager to the user, the private key does not have to remain unknown to the Credential Manager. Thus, the Credential manager stores both the public and the private keys for its users in its database. User's public keys are used to encrypt the key used to encrypt user credentials for distribution. The Credentials Manager stores user's private keys only for backup purposes. Users must have their own copy of their private key so they can decrypt their credentials when received.

Asymmetric key systems are also used for exchanging a session key between a CKM enabled smart card and a workstation. Upon installation of CKM software, a public and private key pair is generated by the workstation and by the smart card for this purpose. A station-to-station protocol, for example ISO9798-3 using mutual authentication with random numbers, is used to exchange a session key that is used to encrypt the communications between the smart card and the workstation.

User Credentials

As shown, for example, in FIG. 2, user credentials, contained in computer files, include a user's permission set, i.e. the label splits, their associated label names and indices that can be used for encryption (write permission) and decryption (read permission), and the permissions to algorithms that may be used. In addition, the organization name and associated split, maintenance level and associated split, header encryption split and certain parameters to be used by the organization are contained in a user's credentials. Policies, such as minimum password length, are also included in the user's credentials. When digital signatures are used, a copy of all the organization's Credential manager's public keys are included, as well as the user's signed certificate.

In assigning a permission set to a user, the Credential manager looks to that user's role and its related responsibilities and privileges within the organization. Role templates and role hierarchies in the Credential manager software aid the Credential manager in this job. An individual's role may change; hence, credentials may be reissued with different labels, or may even be revoked altogether for an individual who has left the organization.

User credentials are encrypted and must be decrypted by each user before use. Decrypting the credential file is the basis for cryptographically identifying the user. The key used for encryption and decryption is derived from the user's id, as well as a password that only the user knows. Some unique data, such as a date/time stamp associated with the file, or a random number residing in a place different from that of the credentials file is also used. Every time the credentials file is decrypted for use, it is re-encrypted using different data. Since this data is always changing, the credentials file is encrypted with a different key after every use. This increases the work that an adversary must do to break a user's credentials. Since a piece of information other than a password is used, an adversary must determine this unique data before a password guessing attack can take place.

When a smart card is used, a random number can be stored on the smart card. This has the effect of tying the user and the smart card to the credentials file. In this case the credentials file cannot be decrypted without the smart card.

When biometrics are used, the biometric reading offers another piece of information from which to derive the credentials file encryption key if the reading can be reproduced exactly each time. This further ties the user to the credentials file. However, if the biometric reading cannot be reproduced exactly each time it must be compared to a stored baseline template for variance calculation purposes. In this case the template is not used in the encryption of the credentials. Instead, it is used for authentication and is carried in the credentials where it is used to compare to each biometric reading.

The credentials file carries an expiration date. Beyond this date the credentials file is useless. Each CKM encrypted object contains a time stamp in its header. Objects encrypted by others beyond the expiration date of the credentials cannot be decrypted. The maximum time-out value—the time from credentials issuance to credential expiration—is set by the Policy Manager. A Credential manager may further restrict the time-out but cannot extend the time-out value when issuing credentials to a user. To use CKM after credentials have expired, a user must have credentials reissued by that user's Credential manager.

Upon issuance, or re-issuance of a credentials file, the Credential Manager software generates a new "first-use" password. before the new credentials can be used for the first time the "first-use" password must be used to decrypt the credentials and then a new password must be provided for subsequent encryption and decryption of credentials.

The "first-use" password is generally transmitted to the user using a different communication channel than that used to transmit the credentials file. An asymmetric key cryptographic algorithm may be used to encrypt a "first-use" key. A private key provided by the Credential Manager is used to recover this "first-use" key and decrypt the credentials.

When biometrics are used in the encryption of the credentials file, the user's public key is contained in the credentials and will be used as a check. Only the correct biometric reading will produce a private key that generates a public key that matches the one in the credentials.

To be able to encrypt, decrypt, sign, and verify objects, a user must have credentials. They provide most of the "secret" information needed for these actions and are tied to a user with strong authentication techniques when the full CKM system is used. A user's access permissions may be revoked by taking away that user's credentials or by allowing them to expire without renewal. If credentials are required to be stored on a server then a user's credentials may be removed immediately. Once the Policy Manager issues a new maintenance split, user credentials that have not been updated are useless for any data encrypted after this update—a further means to force a user off the system.

The Header

As shown, for example, in FIG. 2, every encrypted object contains added information that is referred to as the CKM header. This information is needed to decrypt the object. It contains, as a minimum, an index to the label splits and the algorithm used in the encryption process, the organization name, the maintenance level pointing to the maintenance split to be used, and the random split. The random split is encrypted by using an encryption key based upon the same label splits used to encrypt the object. To be able to recover the random split, a user must have read access to the label splits that were used in encrypting the object. The organization split, maintenance split, and label splits that are contained in a user's credentials, along with the random split recovered from the CKM header, allow the encryption key to be recovered. The object may then be decrypted.

Also contained in the CKM header is a time stamp indicating the date and time the object was encrypted. CKM will not allow a user with credentials that have expired before this date to decrypt the object.

The ID of the user who encrypted the object, as well as the identity of that user's Credential manager is contained in the header. If a digital signature is used, it is contained in the header along with the user's certificate. With the appropriate Credential manager's public key, all of which are contained in each user's credentials, the certificate may be decrypted to recover the signing individuals public key. This public key is used to verify the digital signature once the message is decrypted.

Most of the header itself is encrypted using a constant header split. The intent of using this split is not security. This is a step to discourage anyone from trying to break the system by preventing easy initial success. All information in the header is either public, or in the case of the random split, encrypted within the header.

Data contained in the header can offer a basis for certain types of information searches and database queries. Search engines could contain logic to look at the CKM header to provide data separation. Since decryption the header does not reveal message contents, a process may be placed on network monitoring and control devices to check traffic for verification, integrity, routing, etc. without revealing the encrypted data. For example, label information contained in the header can be the basis for keeping encrypted data confined to a network by having routers prevent data with particular labels from crossing certain network boundaries. Thus, by using the header, CKM lends itself to managing and encrypting data-in-transit over a network, as well as static data-at-rest.

Data Separation

Data separation is the process of assigning data to and restricting access to each category based on need-to-know. One way of accomplishing this is by physically placing data where unauthorized people can not access it. However, providing physically separate networks or machines to host different sets of data is costly. CKM provides a way of separating data so those with authority will have access to it without having to physically keep the data confined to different networks, hard disk drives, servers, etc.

Key Recovery

Key recovery in CKM is an organized process to regenerate the encryption key requiring several deliberate events, plus access to the encrypted object. The Policy Manager may initiate this process and provide any Credential Manager with all label splits required. The Credential Manager is able to provide credentials with read capability for label splits that were used to encrypt the object.

Note that an expiration date is set for credentials files. It is possible for the Credential manager to create a credentials file that is valid for only one day. For example, pursuant to a judicial order, law enforcement may be issued read-only splits to recover information they need. They would not be able to recover information encrypted subsequently.

Another reason to use key recovery would be for recovering data encrypted by an employee that has left the organization, died, or who has become incapacitated. The loss of an individual does not mean that data encrypted by that individual cannot be recovered.

If a user's original credentials are lost or the password is forgotten, CKM can recreate a user's credentials. This is accomplished by simply issuing new credentials to the user. The user chooses a new password upon initial use of the new credentials. In some cases it is possible to regenerate the original private and public keys assigned to a user for authentication.

User Authentication Enhancements

Strong user authentication requires something that an individual knows, something possessed by the individual, and something that individual is. Passwords, something known, are used for rudimentary user authentication. Smart cards (or other tokens) are something possessed. Biometric data is something an individual is. All three may be used in CKM.

Smart Cards

Smart cards may be used to hold key pieces of information in the CKM process. A random number stored on the card may be used as a piece of information in building the key to encrypt each user's credentials. This ties the smart card to the credentials. Without the number stored on the card, decryption of a user's credentials is not possible. The user needs the card to complete session establishment before the CKM system can be used. Other pieces, such as a password, are still needed to log on to CKM. The smart card alone is not sufficient to start a session, thus defeating an adversary who has stolen or otherwise acquired a user's smart card.

User credentials may be stored on the smart card. This would let the user travel to other machines that are not part of the organization's main network and still be able to use the CKM system.

Security is enhanced by keeping decrypted user credentials in the smart card's memory only for the duration of a session, as well as by running the CKM combiner process on the smart card's processor. Local processing within the card increases the workload of an adversary who is attempting to view the internal workings of CKM processes in order to gain information about secret keys.

The SuperCard™

The SuperCard™ is an ISO complaint smart card that has enhanced processing ability and greater memory than current smart cards. It includes tamper resistance and hardware random number generation. The processing capability internal to the card may be used to reduce CKM task processing on the workstation. Even though the bandwidth between the card and the workstation is limited, with CKM only small amounts of data are transferred between the two. Larger memory within the card also makes it possible to store user credential files, as well as "private" CKM applications.

To keep "secret" information, such as splits, from being revealed to someone monitoring communications between the card and the workstation, the communications between the SuperCard™ and the workstation are encrypted. The key agreement protocol used to exchange the encryption key is between the card and the workstation. No additional intelligence is required in the card reader.

An inherently random radio frequency signature, called Resonant Signature-Radio Frequency Identification (RS-RFID), that is provided by tangents embedded within the card, aids tamper resistance. The digital representation of the RS-RFID of the card is contained within a user's credentials file and is encrypted with the credentials. Any tampering with the card will change the RS-RFID of that card. When the damaged RS-RFID is used, the wrong radio signature is read and will not compare to the decrypted value of the RS-RFID from the user's credentials file. Thus, tampering with the card will be detected. The card reader that reads the SuperCard™ contains hardware to read the RS-RFID signature. In addition, the SuperCard™ may be used in ISO standard card readers. In these cases the RS-RFID would be ignored and tamper evidence would not be provided.

Random numbers are needed for object encryption and other operations. In the absence of hardware random number generation, CKM resorts to a software pseudo-random number generator. A feature provided with the SuperCard™ is hardware random number generation capability. Using the hardware source provides much better random number generation and contributes to the strength of the overall security of the CKM system.

Biometric Data

As shown, for example, in FIG. 1, the process of using a biometric device can generally be described as follows: Initially, a biometric reading taken from the device is digitized; the digital representation is mathematically transformed, and then is stored somewhere as a template. Subsequent biometric readings are compared to this template for verification. Biometric readings may also be used for identification by comparing a biometric reading to templates stored in a database. A match from this database establishes identification. CKM uses biometrics only for verification during session establishment.

In general, biometric readings will vary by a small amount. A variance from the template value is allowed and is set according to the application and security requirements. This variance is an adjustable factor calculated from the false-success and the false-rejection rates.

Most biometrics can only give a "yes or no" answer to the template comparison. If higher false-success rates can be tolerated, mathematical techniques applied to some types of biometric readings can be used to transform the reading into a repeatable number that can be matched exactly to a stored template. With a repeatable number, biometric data can be provide CKM with information used to derive keys used in symmetric and asymmetric key cryptosystems.

It is desirable not to store a biometric reading, including the biometric template, even if it is encrypted. If a repeatable number can result from biometric readings, these biometric values may be used as a piece of data to build the key to unlock user credentials. They may also be used as the basis for the private key in asymmetric key systems used for message authentication.

During user verification, upon decryption of the credentials file using a biometric value, the user ID field in the decrypted credentials file is compared to the ID typed by the user. If the comparison is favorable, the user has been authenticated and the data in the credentials file has been decrypted correctly. Biometric data as part of the key used in encrypting a user's credentials file ties that user to the credentials.

Since other pieces of information, such as a password, user ID, and other data, such as a random number, are used to create credentials encryption key, higher false-success rates from the biometric can be tolerated. Even if two people generate the same biometric value, the credentials encryption key would not be the same for the two since their user ID's and passwords, as well as ephemeral data are not the same.

A user's private key for digital signatures may be based on the user's repeatable biometric template. A user's public key is generated from the private key. The public key is recorded in the user's Credential Manager's user database as part of the enrollment process. Requiring the user to be present for enrollment establishes identity but other acceptable methods establishing identity can be used.

When repeatable biometrics readings are used, a user's private key, although not stored, is recoverable if lost. In this case a biometric reading would establish the private key and generation of the corresponding public key may be checked against that stored in the Credential Manager's database.

If a repeatable number cannot always be guaranteed from a biometric reading, then a biometric template must be stored for comparison with subsequent biometric readings. In this case the biometric template would be encrypted within a user's credentials file. During user authentication, the credentials file would be decrypted, recovering the biometric template, and then the biometric reading taken for authentication would be compared to the template and a "yes or no" answer would result.

Message Authentication

Asymmetric key cryptographic systems are used in CKM for the three message authentication related objectives stated above. If only data integrity is desired, message authentication codes may be used. If data integrity coupled with secrecy is required, message manipulation codes with asymmetric key encryption can be used. To meet all three message authentication objectives, while providing secrecy, digital signatures are used.

Digital Signatures

Digital signatures are used to provide data origin authentication, data integrity, and non-repudiation. The infrastructure provided by CKM supports a form of a Public-Key Infrastructure (PKI) that distributes signed certificates and public keys used in digital signature verification. In other proposed public-key systems the certificate authority takes the form of a database on a server that uses query via a network. In CKM, Credential Managers act as certificate authorities. All information for verifying digital signatures is provided in each user's credentials and in CKM encrypted objects. Additional bandwidth due to network and server processing is not required as it is in other public-key systems.

The certificate for a user is signed by that user's Credential Manager. Each Credential Manager has its own public and private key. The public keys of the organization's Credential Managers are provided in each user's credentials. The Credential manager encrypts, i.e. signs, a user's ID and public key combination with the Credential Manager's private key. This is a basic user certificate. It may be decrypted only by using the Credential Manager's public key.

A user's certificate is contained in that user's credentials so that it may be sent with CKM objects the user has signed. The recipient of a signed object uses the Credential Manager's public key to decrypt the sender's certificate and recover that user's public key. The recovered sender's public key is then used to verify the sender's digital signatures on the signed object.

A user's biometric template, when available, can form the basis of a user's private-key. For example, in the El Gamal Signature Scheme, a public key is the combination of a prime number, p, a primitive element, $\alpha$, and a value, $\beta$, computed from a private number $\alpha$. This private number is usually picked at random. However, in CKM the user's biometric template could become this private number, or part of this number. Because of this, private and public keys used for authentication are tied to an individual. The public/private keys may be recovered (negating the need for storage) if a repeatable biometric value can be obtained.

Manipulation Detection Codes (MDCs)

If privacy and data integrity without regard to data origin authentication and non-repudiation are desired, an MDC combined with CKM encryption may be used. An MDC is basically an "unkeyed" hash function that is computed from the message. This hash is then appended to the message, and the new message is encrypted.

From verification of data integrity, a recipient decrypts the message, separates the hash from the message, computes the MDC of the recovered message, and compares this to the decrypted hash. The message is accepted as authentic if the values match.

Message Authentication Codes (MACs)

If only data integrity without regard to privacy is needed, a MAC can be used with CKM. The working key for the MAC is constructed in the same way as that for the key used for encrypting a message for privacy, i.e. by using the CKM combiner process with label splits, organization split, maintenance split and a random split.

To verify data integrity the recipient of the MACed message uses the splits associated with the message to rebuild the key for the MAC. A new MAC is then calculated by the recipient and compared to the MAC sent with the message. If the two MACs match, the message is accepted as not having been altered.

It is not expected that MDCs and MACs will be used as often as digital signatures. Therefore, MDCs and MACs will not be mentioned in the process descriptions that follow.

The CKM Process

Selected processes are described to illustrate how CKM accomplishes its tasks. It is assumed that a smart card such as the SuperCard™ and biometrics with the ability to generate a constant biometric value are used.

Session Establishment (Logging on to CKM)

Use of the CKM system is contingent upon successful logon and decryption of user credentials. Session establishment begins when a CKM enabled program is run on a user's workstation. The workstation prompts the user to present the smart card, user biometrics, user ID and password (logon data). An encrypted channel is established between the workstation and smart card and the logon data is transferred to the smart card where a key is generated to decrypt the user's credentials. The credentials may reside on the smart card or some other location, in which case the encrypted credentials file would be sent to the smart card for decryption and use. Upon successful logon, the credentials file is re-encrypted and stored and a decrypted copy is kept in the smart card's memory for use during the session.

Note that three things are needed to complete logon—a password, a smart card (or token) and biometric information. Without knowing the password, an adversary needs to guess or search the whole password space. Random bits are used as a start for the credential decryption process so that if password guessing were used the output could not so easily be detected by the adversary as correct. Changing these random bits continually prevents an adversary from bypassing the process by "replaying" past results. Password policies, such as minimum characters required in a password, increase security when passwords alone are used for user authentication. Passwords alone are still considered weak authentication. Smart cards and biometrics are recommended for strong authentication.

The smart card must be present to complete logon. Putting random bits for the credentials file key generation on the smart card cryptographically ties that card to the user's credentials and hence to the user. The smart card alone will not complete the logon without a user's password. The password is not stored on the smart card, and so loss of the card to an adversary does not compromise a user's password or the user's credentials.

When the SuperCard™ is used the inherent radio frequency signature detects tampering with the card by comparing this signature to the one stored in the user's credentials. The SuperCard™ can still be used in a standard ISO smart card reader but the RS-RFID would be ignored.

Using biometric data as a piece of information to build the key to decrypt the user's credentials cryptographically ties the biometric data, and hence the user, to the credentials file. Thus, knowledged of the user's password and possession of the user's smart card will not be enough information to decrypt the user's credentials. Compromise of the password and smart card does not disclose a user's biometric data, as it is not stored on the card, or anywhere for that matter, even in an encrypted form.

Once logged on, a user will remain logged on as long as a CKM program is actively being used and while the smart card remains in the card reader. There is a time-out value, set by the Credential manager, beyond which if the user does not actively use a CKM program, the CKM session is disabled. The user must then present the password and biometrics again to continue using CKM enabled software. When a user quits a CKM program and there are no other CKM programs running at that time, the user may log off or continue to stay logged on until the time-out period has lapsed. Within this time-out period, if another CKM enabled program is invoked the user does not have to log on. If, however, the time-out period has lapsed, the user will have to log on again. During this period when no CKM enabled program is running, and before the time-out value has expired, the user may run a utility program that will quickly log that user off.

Encryption with Digital Signature

Encryption of objects requires the choice of a cryptographic algorithm and label splits. This choice will determine who will be able to decrypt the object. Default label and algorithm selection is provided for convenience. This streamlines the encryption process, especially when the majority of data is encrypted using the same label set and algorithm. The Credential Manager may set this default. It can be made most restrictive; in which case a user need change the label selection only to make the label set less restrictive. The splits corresponding to the user-selected and mandatory use labels are used by the CKM combiner process to generate a key that is used to initialize the user selected cryptographic algorithm.

A cryptographic hash is applied to the object's plaintext, i.e. before the data is encrypted. The hash value is then encrypted with the user's private key (which has been generated based on the user's biometric reading) resulting in the digital signature for that object.

Digital signatures may be an option or may be mandatory depending on Policy Manager requirements.

A header is created containing the user's label and algorithm choice, the user's certificate, a digital signature and other information that may be required for decrypting the object. This header is appended to the encrypted object.

Decryption with Digital Signature Verification

Decryption starts by decrypting and reading the header of an encrypted object. If the user has read permission for the labels used in encryption and has access to the algorithm used, then the object may be decrypted.

For signature verification the object must first be decrypted so that a cryptographic hash can be computed. This means that only those who have read permission for the labels used for encryption will be able to verify the digital signature. Once the hash is computed, the public key of the encryptor's Credential Manager is retrieved from the credentials. This public key is used to decrypt the certificate contained in the header, thus recovering the signatories public key. The verification module takes the encryptor's public key, the digital signature and the hash value that was computed from the decrypted data as input. If the verification module returns a "Yes" answer then the object is declared as being authentic.

Detection

The intent of detection is to notify certain individuals and to take certain actions whenever events indicative of intrusion, tampering or failure have taken place. At its simplest, detection is provided with audit of selected events. The minimum events to be audited are determined by the Policy Manager.

Detection can take other forms, such as statistical tests for randomness on generated random numbers. Weak cryptographic key detection may also be performed. These types of alarms would notify or stop a user from continuing with an action that might compromise the security of the system.

An example of another technique is monitors that can read CKM headers periodically, or at random, and verify the label sets contained therein against a user's issued labels per the Credential manager's database. This would aid a security administrator to detect when someone might be trying to gain unauthorized access.

There are many techniques, some of them hardware based, that can be used for event detection and alarm in CKM. Use of these will be under the control of the Policy manager and the Credential Managers.

SUMMARY

CKM technology can provide an effective system for encrypting data-at-rest. It can also provide a suitable system for encrypting data-in-transit. CKM can be extended beyond the application protocol level to lower levels, such as level 2 (for example IEEE 802) in the OSI stack. The CKM encryption protocol to establish the session key for the channel can be adapted to the parameters of the communications environment.

An application programming interface implementing CKM may be used to develop secure applications. Software may be used to provide file and e-mail encryption, incorporating selected elements of the CKM technology described herein. CKM may also be used to add encryption to audio and graphics applications.

Label Set Design

CKM™ uses encryption to provide selective access to information. When encrypting with CKM, users (persons or devices), manually or automatically, select labels they share with intended receivers of the information being encrypted. The user may apply as many labels as needed to target a specific subset of information or information grouping. Only users holding credentials containing matching labels will be able to view the information.

Labels are the humanly understandable counterparts of CKM's cryptographic splits. They form the variable part of a symmetric access control system. The selection and deployment of labels are extremely important in creating a useful cryptosystem.

CKM is well suited for data separation and role-based access to information. Data separation is the process of assigning information to levels or categories and then restricting access to each based on need-to-know or other security policy. Role-based access is the method that assigns access to information by roles performed and then assigns individuals to these roles. Each individual's access to information changes as their roles change. The internet has facilitated the creation of search engines that access information in many databases. The tagging or indexing meth odology of these search engines can be correlated to labels that are included in the cryptosystem.

All information within any organization does not have the same disclosure risk. The disclosure of some information may have a serious negative impact depending on circumstances. A time-honored method to minimize unauthorized disclosures is to keep information within organizational compartments and to establish policies, procedures, and controls appropriate for each.

Labels can mirror established information compartments within an organization. For example, if a large organization has identified 500 information compartments then the CKM Policy Manager would create 500 labels representing these compartments. Specific labels would be assigned to individuals assigned to roles with access to specific compartments. Top-down mandated information compartments simplify the process for individual users. If an individual is assigned to roles within two information compartments, then their CKM credentials only present these two label options for encryption. In practice, however, a total mandated compartment system is not sufficiently flexible. It is best to allow each user some flexibility in designating readership restrictions for material to be sent outside mandated compartments.

Labels also can be used to designate readership across the organization. For example, the label "Personnel Information" may be issued to all persons within the organization. All persons would be able to encrypt information using this label; however, only managers and those persons assigned to the personnel department would be able to decrypt such information. Other "across the organization" labels with similar encrypt and decrypt restrictions might include Security, Legal, Inspector General, or other organizational groups or functions.

The use of templates can aid the distribution of labels. Templates can be made to include labels that represent an organization's information flow boundaries, or to represent a grouping of information subsets. By nesting templates and assigning them to numerous users at the same time, the distribution process is greatly facilitated. For example, a basic role template may be created containing the labels to be assigned to all employees. Additional templates may be created and assigned for supervisors, managers, and executives, or other roles as required.

Care must be taken to design a label set that is as limited as necessary to meet security requirements. The objective should be to combine labels representing a mandated compartment approach with labels that allow for ad hoc and cross organizational (compartment) communications. The resulting label set will allow a simple, easy to use sub-set to be distributed to each user.

What is claimed is:

1. A method of encrypting an object, comprising:
   combining a plurality of key splits to generate a cryptographic key;
   initializing a cryptographic algorithm with the cryptographic key; and
   applying the initialized cryptographic algorithm to the object, to form an encrypted object;
   wherein at least one of the plurality of key splits corresponds at least in part to a biometric measurement; and
   wherein combining a plurality of key splits to generate a cryptographic key is performed on a smart card.

2. The method of claim 1, further comprising:
   for at least one of the plurality of key splits, adding the at least one key split to the encrypted object.

3. The method of claim 1, further comprising:
   for at least one of the plurality of key splits, adding reference data associated with the at least one key split to the encrypted object.

4. The method of claim 1, further comprising retrieving at least one of the plurality of key splits from a storage medium.

5. The method of claim 4, wherein the storage medium is disposed on a smart card.

6. The method of claim 1, wherein combining the plurality of key splits includes applying a non-linear function to the plurality of key splits.

7. The method of claim 6, wherein the cryptographic key is a single-integer cryptographic key.

8. The method of claim 1, wherein the key splits are provided by at least one of a policy manager and a credentials manager.

9. The method of claim 1, wherein the cryptographic algorithm is a symmetrical algorithm.

10. The method of claim 1, wherein the cryptographic key is a session key.

11. In a cryptographic system associated with an organization, a method of encrypting an object by a user, comprising:
    generating a cryptographic key by combining, on a smart card, an organization split corresponding to the organization, a maintenance split, a random split, a biometric split corresponding to the user, and at least one label split;
    initializing a cryptographic algorithm with the cryptographic key;
    encrypting the object according to the initialized cryptographic algorithm;
    adding combiner data to the encrypted object, wherein the combiner data includes
       reference data corresponding to at least one of the at least one label split and the cryptographic algorithm,
       name data associated with the organization,
       at least one of the maintenance split and a maintenance level associated with the maintenance split, and
       the random split; and
    storing the encrypted object with the added combiner data.

12. The method of claim 11, further comprising selecting the at least one label split from at least one credential.

13. The method of claim 12, wherein the selected at least one label split is encrypted, the cryptographic key is a first cryptographic key, and the method further comprises:
    deriving a second cryptographic key from a user ID associated with the user, a password associated with the user, and at least one of a unique data instance and a random value, and
    decrypting the selected at least one label split with the second cryptographic key.

14. The method of claim 12, wherein the at least one credential is retrieved from a memory.

15. The method of claim 14, wherein the memory is disposed on a smart card.

16. The method of claim 12, further comprising generating a time stamp corresponding to a time at which the object was encrypted, wherein the combiner data further includes the time stamp.

17. The method of claim 12, wherein the combiner data further includes a user ID associated with the user.

18. The method of claim 11, further comprising generating a time stamp representing a time at which the object was encrypted, wherein the combiner data further includes the time stamp.

19. The method of claim 11, wherein the combiner data is a header record.

20. The method of claim 11, wherein the combiner data further includes one of a digital signature and a digital certificate.

21. The method of claim 11, wherein the combiner data further includes a digital signature and a digital certificate.

22. The method of claim 11, wherein the cryptographic key is a first cryptographic key, the method further comprising:
generating a second cryptographic key based at least in part on the at least one label split; and
encrypting the random split with the second cryptographic key, prior to adding the combiner data to the encrypted object;
wherein the random split included the combiner data is the encrypted random split.

23. The method of claim 11, further comprising
before adding the combiner data to the encrypted object, encrypting at least a portion of the combiner data with a header split.

24. The method of claim 23, wherein the header split is constant.

25. The method of claim 11, wherein combining the organization split, the maintenance split, the random split, and the at least one label split includes applying a non-linear function to the splits.

26. The method of claim 25, wherein the cryptographic key is a single-integer cryptographic key.

27. The method of claim 11, wherein the organization split, the maintenance split, the random split, and the at least one label split are provided by at least one of a policy manager and a credentials manager.

28. The method of claim 11, wherein the cryptographic algorithm is a symmetrical algorithm.

29. The method of claim 11, wherein the cryptographic key is a session key.

30. A storage medium comprising instructions for causing a data processor to encrypt an object, wherein the instructions include:
generate a cryptographic key by combining a plurality of key splits;
initialize a cryptographic algorithm with the cryptographic key; and
apply the initialized cryptographic algorithm to the object to form an encrypted object;
wherein at least one of the plurality of key splits corresponds at least in part to a biometric measurement; and
wherein the data processor is distributed, and the instruction to generate a cryptographic key is executed at least in part on a smart card.

31. The storage medium of claim 30, wherein the instructions further include:
for at least one of the plurality of key splits, add the at least one key split to the encrypted object.

32. The storage medium of claim 30, wherein the instructions further include:
for at least one of the plurality of key splits, add reference data associated with the at least one key split to the encrypted object.

33. The storage medium of claim 30, wherein the instructions further include:
retrieve at least one of the plurality of key splits from a memory.

34. The storage medium of claim 33, wherein at least a portion of the memory is disposed on a smart card.

35. The storage medium of claim 30, wherein combining the plurality of key splits includes applying a non-linear function to the plurality of key splits.

36. The storage medium of claim 35, wherein the cryptographic key is a single-integer cryptographic key.

37. The storage medium of claim 30, wherein the key splits are provided by at least one of a policy manager and a credentials manager.

38. The storage medium of claim 30, wherein the cryptographic algorithm is a symmetrical algorithm.

39. The storage medium of claim 30, wherein the cryptographic key is a session key.

40. A storage medium comprising instructions for causing a data processor to encrypt an object, wherein the instructions include:
generate a cryptographic key by combining, on a smart card, an organization split corresponding to an organization, a maintenance split, a random split, a biometric split corresponding to the user, and at least one label split;
initialize a cryptographic algorithm with the cryptographic key;
apply the initialized cryptographic algorithm to the object to form an encrypted object;
add combiner data to the encrypted object, wherein the combiner data includes
reference data corresponding to at least one of the at least one label split and the cryptographic algorithm,
name data associated with the organization,
at least one of the maintenance split and a maintenance level corresponding to the maintenance split, and
the random split; and
store the encrypted object with the combiner data for subsequent access.

41. The storage medium of claim 40, wherein the instructions further include select the at least one label split from at least one credential.

42. The storage medium of claim 41, wherein the selected at least one label split is encrypted, the cryptographic key is a first cryptographic key, and the instructions further include:
derive a second cryptographic key from a user ID associated with a user, a password associated with the user, and at least one of a unique data instance and a random value; and
decrypt the selected at least one label split with the second cryptographic key.

43. The storage medium of claim 41, wherein the instructions further include:
retrieve at least one credential from a memory.

44. The storage medium of claim 43, wherein the memory is disposed on a smart card.

45. The storage medium of claim 41, wherein the instructions further include generate a time stamp corresponding to a time at which the object was encrypted, wherein the combiner data further includes the time stamp.

46. The storage medium of claim 41, wherein the combiner data further includes a user ID associated with the user.

47. The storage medium of claim 40, wherein the instructions further include generate a time stamp corresponding to at which the object was encrypted, wherein the combiner data further includes the time stamp.

48. The storage medium of claim 40, wherein the combiner data is a header record.

49. The storage medium of claim 40, wherein the combiner data further includes one of a digital signature and a digital certificate.

50. The storage medium of claim 40, wherein the combiner data further includes a digital signature and a digital certificate.

51. The storage medium of claim 40, wherein the cryptographic key is a first cryptographic key, and the instructions further include:

generate a second cryptographic key based at least in part on the at least one label split; and encrypt, with the second cryptographic key, the random split, prior to executing the instruction to add the combiner data to the encrypted object;

wherein the random split included in the combiner data is the encrypted random split.

52. The storage medium of claim 40, wherein the instructions further include prior to executing the instruction to add the combiner data to the encrypted object, encrypt at least a portion of the combiner data with a header split.

53. The storage medium of claim 52, wherein the header split is constant.

54. The storage medium of claim 40, wherein combining the organization split, the maintenance split, the random split, and the at least one label split includes applying a non-linear function to the splits.

55. The storage medium of claim 54, wherein the cryptographic key is a single-integer cryptographic key.

56. The storage medium of claim 40, wherein the organization split, the maintenance split, the random split, and the at least one label split are provided by at least one of a policy manager and a credentials manager.

57. The storage medium of claim 40, wherein the cryptographic algorithm is a symmetrical algorithm.

58. The storage medium of claim 40, wherein the cryptographic key is a session key.

* * * * *